United States Patent [19]
Goud et al.

[11] Patent Number: 5,995,850
[45] Date of Patent: Nov. 30, 1999

[54] METHOD AND APPARATUS FOR ON-THE-FLY MODE CHANGE IN A PAGING TRANSMITTER

[75] Inventors: Paul Andrew Goud, Coquitlam, Canada; Kyle Jackson Drewry, Quincy, Ill.; Roderick David Earle Filer; Tony Lung Chan, both of Vancouver, Canada

[73] Assignee: Glenayre Electronics, Inc., Charlotte, N.C.

[21] Appl. No.: 08/825,728

[22] Filed: Apr. 2, 1997

[51] Int. Cl.$^6$ ................................................. H04Q 1/00
[52] U.S. Cl. ......................... 455/560; 455/31.2; 455/38.1
[58] Field of Search .................. 455/31.2, 503, 455/502, 38.1, 458, 426, 443, 45, 560

[56] References Cited

U.S. PATENT DOCUMENTS

| | | | |
|---|---|---|---|
| 5,031,230 | 7/1991 | Sandahl et al. | 455/503 |
| 5,054,113 | 10/1991 | Jasinski | 455/503 |
| 5,128,934 | 7/1992 | Jasinski | 455/503 |
| 5,170,487 | 12/1992 | Peek | 455/45 |
| 5,369,682 | 11/1994 | Witsaman et al. | 455/503 |
| 5,418,818 | 5/1995 | Marchetto et al. | 455/503 |
| 5,483,665 | 1/1996 | Linquist et al. | 455/503 |
| 5,726,640 | 3/1998 | Jones et al. | 340/825.22 |
| 5,745,840 | 4/1998 | Gordon | 455/503 |

*Primary Examiner*—Edward F. Urban
*Assistant Examiner*—Thuan T. Nguyen
*Attorney, Agent, or Firm*—Christensen, O'Connor, Johnson & Kindness PLLC

[57] ABSTRACT

A method and apparatus for on-the-fly mode change in a paging system (201) is provided. A transmitter controller (301) in a base station (207) receives paging information. From the paging information, the transmitter controller (301) is capable of identifying a plurality of paging protocols associated with the paging information. Each identified paging protocol is associated with a corresponding mode. Mode information ($D_3$, $D_4$) corresponding to each mode is provided to an exciter (303). Based upon the mode information, the exciter (303) modulates a frequency using predetermined values of frequency deviation and frequency offset associated with the mode. The exciter (303) produces a modulated signal that transitions from one mode to another without delay.

31 Claims, 9 Drawing Sheets

METHOD AND APPARATUS FOR ON-THE-FLY MODE CHANGE IN A PAGING TRANSMITTER

FIELD OF THE INVENTION

The present invention relates to radio frequency (RF) communication systems in paging systems and, more particularly, to a method and apparatus for improving the efficiency in paging transmitters broadcasting a mixture of protocols.

BACKGROUND OF THE INVENTION

Simulcast paging systems are well known in the art of paging communication systems. For example, U.S. Pat. No. 5,369,682, assigned to the same assignee as the present invention and incorporated herein by reference, discloses a digital simulcast paging system. In general, such a system includes a paging switch connected to the public switched telephone network, and a plurality of base stations (also referred to as paging stations or transmitters). A caller wishing to page a subscriber of the paging system calls the paging switch using the public switched telephone network. The paging switch then formulates a page to the subscriber and distributes the page to each of the paging base stations. The paging base stations then simultaneously broadcast (simulcast) the page. The subscriber receives the page through a personal paging unit (or "pager") that the subscriber carries.

Paging base stations may include the capability of transmitting pages according to multiple paging protocols. Further, pages encoded under different protocols may be time division multiplexed to increase throughput and decrease the system's costs. Thus, for example, modern paging transmitters are capable of transmitting pages according to a variety of protocols, including, for example, POCSAG™ and FLEX™ protocols. In this regard, each protocol requires that data is transmitted with a predetermined frequency deviation from a given center frequency. Typically, pagers designed for POCSAG™ require a frequency deviation of ±4500 Hz. Pagers designed for FLEX™ require a frequency deviation of ±4800 Hz.

In a simulcast paging system, difficulty can arise in those geographic areas that can receive signals from more than one paging station. Such geographic areas are commonly referred to as "overlapping areas". FIG. 1 depicts two base stations, base station #1 and base station #2. The circles represent the physical area covered by transmissions from each of the two base stations, respectively. The common area defined by the circles constitutes an overlapping area. To ensure continuous coverage over a large geographic area, base stations are positioned in such a way as to guarantee an overlapping area between adjacent base stations.

The problem associated with overlapping areas in a paging system involves two aspects of paging: frequency synthesis and simulcasting. With respect to frequency synthesis, pagers tune to a specific frequency to "listen" for their pages. The present generation of exciters used in a paging transmitter can synthesize radio frequencies with an accuracy of better than 1 Hz. Simulcasting describes the simultaneous manner in which a transmitted paging signal leaves the antenna of all base stations in a paging system. Simulcasting is required for continuous paging coverage in overlapping areas. Presently, the capabilities of simulcast paging systems can ensure the simultaneous transmission of paging data from base stations to within a microsecond.

The precision and accuracy of frequency synthesis and simulcasting, however, leads to a problem present in the overlapping areas in a paging system. More specifically, they cause patterns of time-invariant constructive and destructive RF interference. This time-invariant RF interference is sometimes referred to as standing waves. In a zone of destructive interference, it will be appreciated that a pager could fail to receive a page. The problems present in overlapping areas is further discussed in "System integration of the FLEX™ paging protocol," (Parts I & II) by Lee 1. Williams, available from Glenayre Electronics, Inc., Charlotte, N.C.

To eliminate the likelihood of lost pages, a protocol-dependent frequency offset is introduced between adjacent base stations. The magnitude of the offset is approximately a few hundred hertz in typical applications. The offset reduces the duration of the destructive interference to a predetermined length of time, ensuring that a pager will not miss a page due to the standing wave phenomenon. In this way, the problems associated with time-invariant RF interference are effectively eliminated.

Frequency offset and frequency deviation together constitute "mode information" corresponding to a particular protocol. Each protocol has an associated "mode setting" that is unique to it. The accuracy of the mode setting is necessary for the optimal performance of the paging system. In particular, implementing the correct mode setting better guarantees the receipt of pages by pagers.

Base stations are sometimes designed so that they can broadcast pages according to various protocols having an associated mode setting. In this way, a base station can transmit information not only to pagers of a certain protocol, but also to additional pagers of other protocols. One conventional approach for mixing broadcasts of different protocols at a predetermined carrier frequency involves compromise. Both protocols are mixed together on one channel. To broadcast under different protocols, the optimal mode setting values for each protocol are not used. Rather, compromise values for the mode setting are selected in an attempt to suit all relevant protocols. For example, if the POCSAG™ and FLEX™ protocols are used, one deviation frequency and one offset frequency would be chosen to accommodate both protocols.

Significant drawbacks result from this conventional approach. Although the use of compromise mode settings in this manner provide adequate paging some of the time, the reception of pages in overlapping areas is far from guaranteed. In fact, even the reception of pages in non-overlapping areas is unreliable. Because they often require the exact mode settings they are designed to receive, pagers, depending on this brand and protocol, cannot routinely receive the pages directed to them under this conventional approach.

Another conventional approach for mixing protocols has been used extensively. In this approach, a multi-channel exciter is typically used in a base station. Normally, only a single pair of offset frequency and deviation frequency, i.e., one mode setting, could be defined for one channel in the exciter. Accordingly, only one protocol with its associated mode setting could correspond to a channel. In the event that, for example, two protocols were to be mixed at a given carrier frequency, two channels in the exciter had to be used. Although the carrier frequency for each protocol was identical, the mode settings still had to be customized for each of the two protocols.

Broadcasting one protocol per channel in this conventional way provided multi-mode operation. For example, suppose the POCSAG™ protocol is to be transmitted on a first channel in the exciter of the base station and the FLEX™ protocol is to be transmitted on a second channel. In operation, assume that the transmitter is keyed up on the first channel to transmit the POCSAG™ protocol. To transmit the FLEX™ protocol, the transmitter must key down the first channel, implement a channel change, and key up the second channel. Exciters used in this conventional approach can sometimes expend up to approximately 300 ms to implement a channel change.

Substantial disadvantages also plague this conventional approach. Managing a base station under this approach is both time consuming and labor intensive for paging service providers. Furthermore, each protocol's need for a separate channel effectively wastes channels and thus substantially limits the capability of base stations to transmit pages at various frequencies.

In addition to these limitations, an even more fundamental problem is presented. It will be appreciated that the upper limit on the number of subscribers for a given carrier frequency is dictated by the time needed to transmit paging information. Reducing the transmission time of paging data allows paging service providers to carry more subscribers on the given carrier frequency and attendantly increase their revenue. In this regard, the approximately 300 ms wasted to implement a protocol change during multi-mode operation constitutes a significant time period wherein no paging data can be transmitted. During this time no revenue can be produced. This sacrifice of potential revenue-producing time can amount to thousands of dollars of lost revenue per month for a paging service provider. Over time, the loss of revenue-producing time can be significant.

It is apparent that the above-mentioned and other conventional approaches to provide mixing protocols in a paging system are unsatisfactory. The prior art methods are both unreliable and unduly expensive. The present invention is a reliable and cost effective way for implementing multi-mode operation in a paging system.

SUMMARY OF THE INVENTION

A method and apparatus for on-the-fly mode change in a paging system is provided. A transmitter controller in a base station receives paging information. From the paging information, the transmitter controller is capable of identifying a plurality of paging protocols associated with the paging information. Each identified paging protocol is associated with a corresponding mode. Mode information corresponding to each mode is provided to an exciter. Based upon the mode information, the exciter modulates a frequency using predetermined values of frequency deviation and frequency offset associated with the mode. The exciter produces a modulated signal that transitions from one mode to another without delay.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
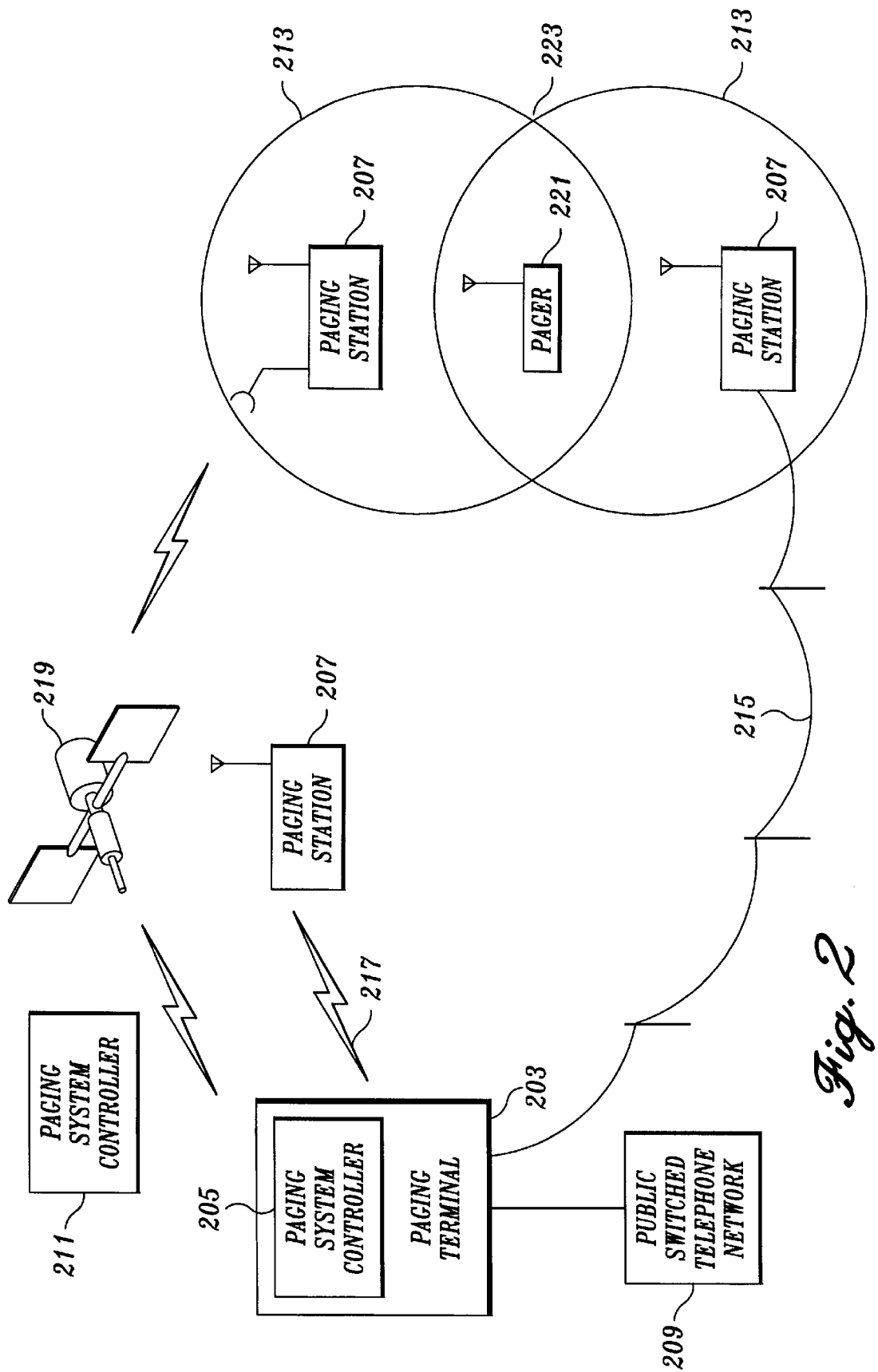
FIG. 2 is a block diagram of a paging system.

FIG. 2 illustrates a paging system 201 including the method and apparatus for on-the-fly mode change in accordance with the present invention. The paging system 201 includes a paging terminal 203, a paging system controller 205 and a number of base stations 207 (also referred to as paging transmitters). The base stations 207 are spread over a wide geographic area. The paging system controller 205 is integral with the paging terminal 203.

The paging terminal 203 is connected to a public switched telephone network 209 for receiving incoming telephone calls that comprise requests to page individuals to subscribe to the paging system 201. In response to the incoming calls, the paging terminal 203 creates pages transmitted by the paging terminal 203 to the paging system controller 205. The paging system controller 205 bundles the pages into paging data blocks (PDBs) 211 that are forwarded to the base stations 207. The base stations 207 in turn broadcast the pages over a specific geographic area, as represented by circles 213. A pager 221 ultimately receives the broadcast pages.

The actual method by which the PDBs 211 are forwarded to the base stations 207 depends on many factors. These factors include, for example, the hardware of the base stations 207, the distance to the base stations 207, and the economics of employing specific forwarding systems. For example, PDBs 211 can be forwarded over a hard wire or fiber optic telephone link 215. Other base stations 207 are configured to receive the PDBs 211 over a microwave link 217, while still others receive them over a satellite link 219.

Figure 1:
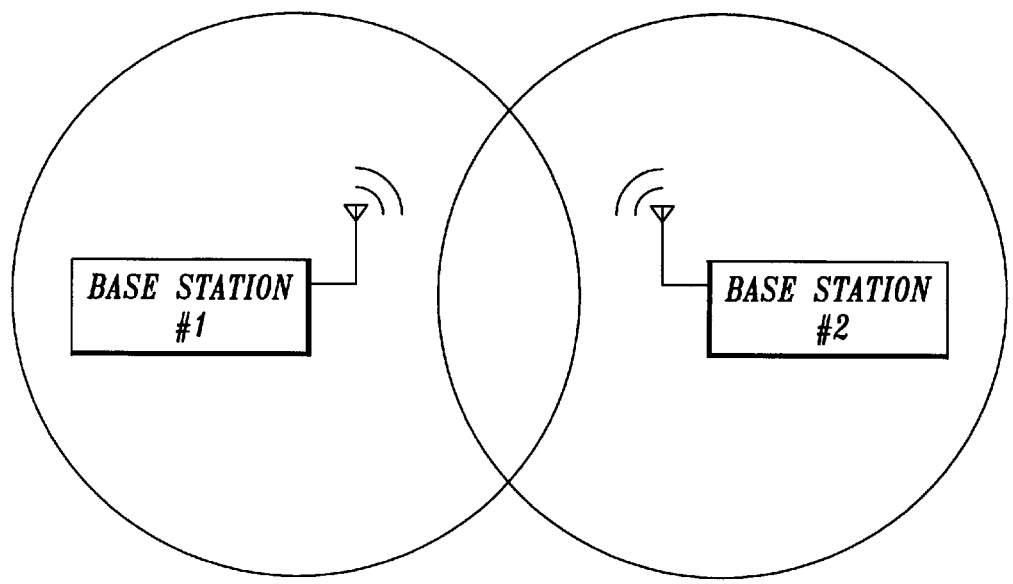
FIG. 1 is an illustration showing an overlapping area, prevalent in the prior art, where pages could be lost.
Figure 3:
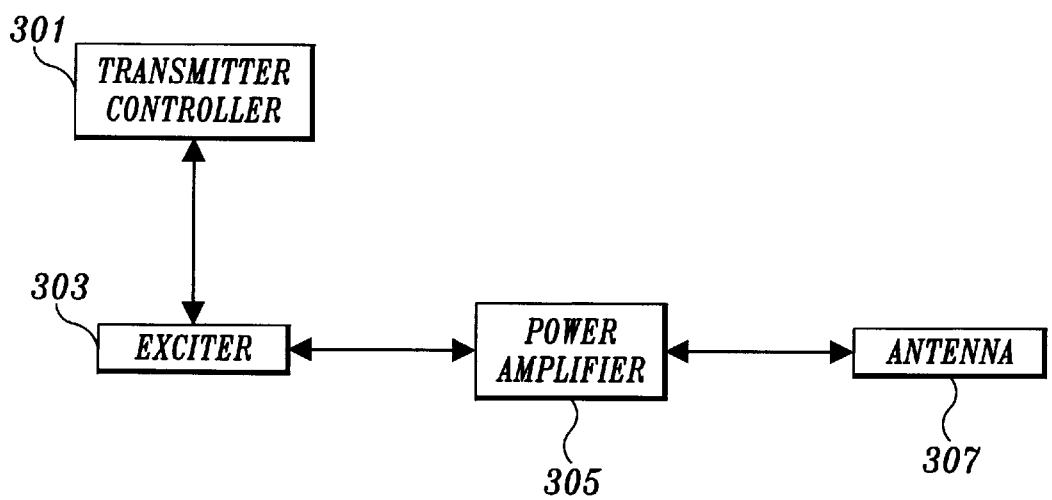
FIG. 3 is a block diagram of a base station in accordance with the present invention.

FIG. 3 further illustrates the base station 207 of the paging system 201 in accordance with the present invention. The base station 207 includes a transmitter controller 301, an exciter 303, a power amplifier 305, and an antenna 307. The transmitter controller 301 receives paging data from the paging terminal 203 over an analog or digital link, as described above. The paging data is provided from the transmitter controller 301 to the exciter 303. The exciter 303 selectively modulates the data. The operation of the transmitter controller 301 and the exciter 303 as it relates to the method and apparatus for on-the-fly mode change in accordance with the present invention is described in more detail below. Although the transmitter controller 301 and the exciter 303 are depicted in FIG. 3 as separate components in the paging station 207, the transmitter controller 301 and the exciter 303 may alternatively be integrated as one component.

The output of the exciter 303 is applied to the power amplifier 305 where the output signal is amplified to an appropriate level for ultimate transmission. The amplified signal emerging from the power amplifier 305 is broadcast by the antenna 307. In accordance with the present invention, the base station 207 can broadcast pages according to a plurality of paging protocols by sequentially transitioning from one protocol to another with no effective delay.

Figure 4:
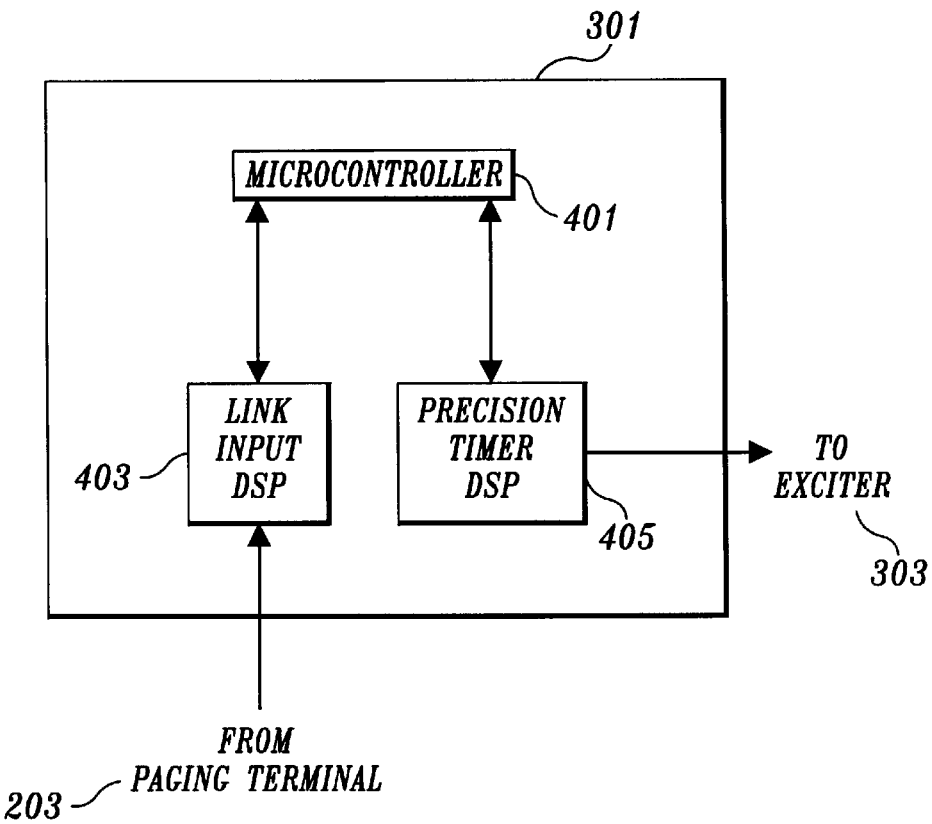
FIG. 4 is a block diagram of a transmitter controller in accordance with the present invention.

FIG. 4 illustrates the pertinent components of the transmitter controller 301 as it relates to the present invention. The transmitter controller 301 is preferably a Glenayre C2000, and primarily includes a microcontroller 401, a link input digital signal processor (DSP) 403, and a precision timer digital signal processor (DSP) 405. The link input DSP 403 receives analog or digital paging data in the form of batches from the paging terminal 203. The batches include a protocol identifier, i.e., tag, to identify the protocol under which the paging data is encoded.

The link input DSP 403 provides the paging data, along with the protocol identifier to the microcontroller 401. In the preferred embodiment, a Motorola™, type 68302 is used for the microcontroller 401, although other similar microcontrollers could be used alternatively. The microcontroller 401 interprets the paging data and recovers certain information therein, including the duration of the paging data, the amount of the paging data, the start time of the paging data, and the paging data itself. It will be appreciated that the microcontroller 401 also sends and receives information to and from the link input DSP 403 for general monitoring purposes.

The microcontroller 401 also receives and processes the protocol identifier. More specifically, from the protocol identifier, the microcontroller 401 identifies the protocol under which the paging data is encoded. After identifying the protocol, the microcontroller 401 preferably uses a look-up table to determine corresponding binary values supplied from the precision timer DSP 405 to the exciter 303 as $D_3$, $D_4$, as discussed below. In the preferred embodiment, the microcontroller 401 determines the binary values of $D_3$, $D_4$ from the identified protocol according to the following table:

| PROTOCOL | MODE | $D_3$, $D_4$ |
| --- | --- | --- |
| POCSAG ™ | A | 1 1 |
| FLEX ™ | B | 0 1 |
| REFLEX ™ | C | 1 0 |
| ERMES ™ | D | 0 0 |
| | | |
| FLEX ™ | B | 0 1 |
| REFLEX ™ | C | 1 0 |
| ERMES ™ | D | 0 0 |

If the POCSAG™ protocol is identified, $D_3$ and $D_4$ are assigned the binary values 1, 1 corresponding to mode A. If the FLEX™ protocol is identified, $D_3$ and $D_4$ are assigned the binary values 0, 1 corresponding to mode B. If the REFLEX™ protocol is identified, $D_3$ and $D_4$ are assigned the binary values 1, 0 corresponding to mode C. If the ERMES™ protocol is identified, $D_3$ and $D_4$ are assigned the binary values 0, 0 corresponding to mode D.

Of course, the look-up table in the microcontroller 401 could be configured according to variations of the table illustrated above. In this regard, paging protocols different from those listed in the above table could be accommodated therein. For example, the GOLAY™ protocol could be substituted for the POCSAG™ protocol. In that case, the GOLAY™ protocol would be associated with the binary values 1, 1 for $D_3$, $D_4$ corresponding to mode A.

Other variations of the look-up table illustrated above are also possible. In this regard, binary values for $D_3$, $D_4$ could correspond to different modes. For example, mode A could correspond to binary values 0, 1 while, for example, mode B could correspond to binary values 1, 1. In yet another variation four paging protocols need not all be used. Instead, any number of possible modes could be accommodated by the look-up table. Instead, the look-up table could be configured to accommodate, for example, only two paging protocols. If a plurality of channels are to be used, as the present invention anticipates, a table similar to the one above would be necessary to describe each channel. In summary, it will be readily appreciated that the microcontroller 401 could operate in ways alternative to the approach described in the above look-up table.

Once the values of $D_3$, $D_4$ are determined, the precision timer DSP 405 conveys the appropriate values of $D_3$, $D_4$, along with other information, to the exciter 303. Eight data lines serve as an interface to send information from the precision timer DSP 405 to the exciter 303. The eight data lines comprise two data lines for carrying actual paging data information; two mode lines for carrying mode information to control the mode; a key line to key up the power amplifier 305; and three frequency lines for selecting a frequency. The pertinent information provided to the exciter 303 as it relates to the present invention involves only the two data lines and the two mode lines. Accordingly, the operation of the exciter 303 is discussed only in regard to the two data lines and the two mode lines.

The two data lines and two mode lines each carry binary information. More specifically, data information carried on the first of the two data lines is binary value $D_1$, while data information carried on the second of the two data lines is binary value $D_2$. Similarly, mode information carried on the first of the two mode lines is binary value $D_3$, while mode information carried on the second of the two mode lines is binary value $D_4$. Of course, the assignment of mode information and paging information may be rearranged so that any combination of the eight data lines may be used.

The identification of a particular protocol by the precision timer DSP 405 is provided to the exciter 303 using the mode lines. The binary values corresponding to a particular mode are conveyed over the mode lines as $D_3$, $D_4$. For example, according to the above table, the precision timer DSP 405 will provide 1, 1 as $D_3$, $D_4$ to indicate mode A and its associated POCSAG™ default protocol. As another example, the precision timer DSP 405 will provide 0, 1 as $D_3$, $D_4$ to indicate mode B and its associated FLEX™ protocol.

Figure 4A:
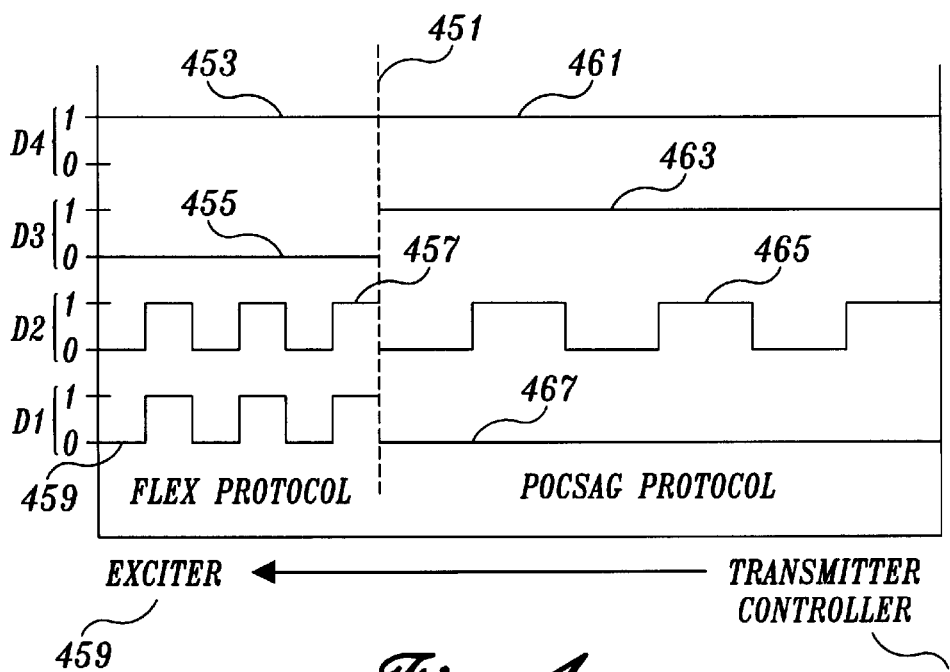
FIG. 4A is a graph depicting data information and mode information provided by the transmitter controller.

FIG. 4A is a graphical depiction of the data information and mode information provided from the precision timer DSP 405 to the exciter 303. The preferred operation of the precision timer DSP 405 will now be described in conjunction with FIG. 4A. Two paging protocols are provided to the exciter 303, in this example, POCSAG™ and FLEX™. Lines 461, 463, 465, and 467 together constitute data information and mode information corresponding to POCSAG™. In particular, lines 467 and 465 represent data information $D_1$, $D_2$ respectively, while lines 463, 461 represent associated mode information $D_3$, $D_4$ respectively. In the example illustrated in FIG. 4A, binary values 1, 1 for $D_3$, $D_4$ have been selected to correspond to POCSAG™.

Lines 453, 455, 457, and 459 together constitute data information and mode information corresponding to FLEX™. Lines 459 and 457 represent data information $D_1$, $D_2$ respectively, while lines 455 and 453 represent associated mode information $D_3$, $D_4$ respectively. In this case, the binary values 0, 1 for $D_3$, $D_4$ correspond to the FLEX™ protocol, as indicated in the table above. The precision timer DSP 405 provides information to the exciter 303 so that the data transmission is precisely synchronized with the associated mode transmission.

Line 451 represents the transition from FLEX™ to POCSAG™ during the transmission of data and mode information. With respect to data information $D_3$, $D_4$, the precision timer DSP 405 transitions from to FLEX™ to POCSAG™ so that only a small, predetermined delay, if any, occurs between the trailing edge of the last bit under FLEX™ and the leading edge of the first bit under POCSAG™. The predetermined delay is graphically represented as the width of line 451. The precision timer DSP 405 provides the transition of the corresponding mode information $D_3$, $D_4$ from FLEX™ to POCSAG™ at and within the time of the transition of the data information $D_1$, $D_2$. In essence, the transition of data information $D_1$, $D_2$ and mode information $D_3$, $D_4$ from one paging protocol to another is synchronized. It will be appreciated that the present invention can transition between FLEX™ and POCSAG™ in reverse order, i.e. so that first POCSAG™ and then FLEX™ are transmitted. It will be further appreciated that synchronized transitions between any protocols, not merely between FLEX™ and POCSAG™, are possible. The exciter 303 receives the data information $D_1$, $D_2$ and mode information $D_3$, $D_4$ and is capable of processing the information while also transitioning between modes within the time of the predetermined delay. It will be appreciated that the modulating capabilities of the exciter 303 to perform on-the-fly mode changes allows the base station 207 to transition from the broadcast of pages according to one paging protocol to another paging protocol effectively without delay. As discussed above, the preferred embodiment provides data information $D_1$, $D_2$, synchronized to its corresponding mode information $D_3$, $D_4$ during the transmission between the transmitter controller 301 and the exciter 303. Alternatively, the synchronization of the data information $D_1$, $D_2$ with the mode information $D_3$, $D_4$ could be achieved in the exciter 303, after the data information $D_1$, $D_2$ and the mode information $D_3$, $D_4$ are transmitted by the transmitter controller 301 to the exciter 303.

Figure 5:
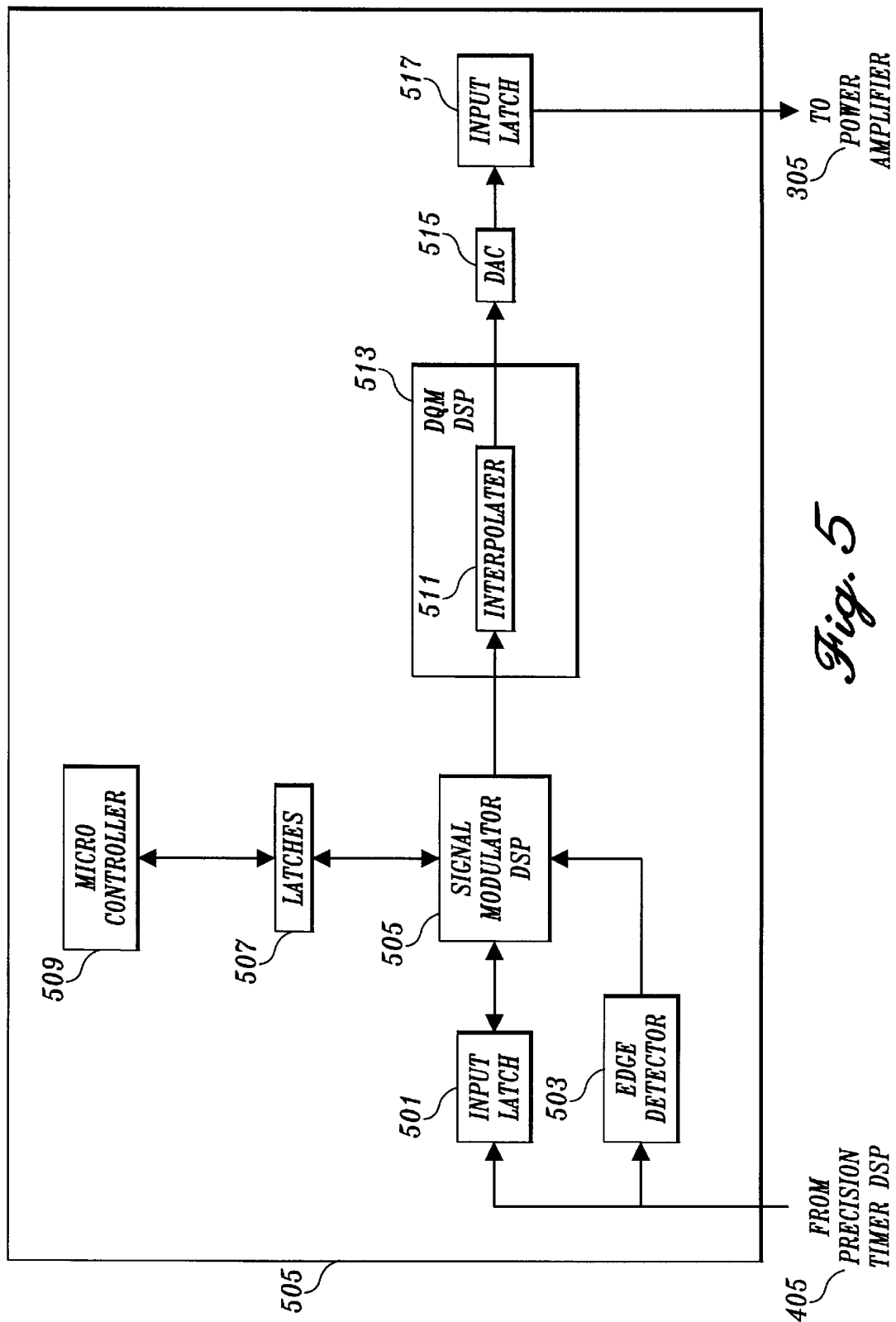
FIG. 5 is a simplified block diagram of an exciter in accordance with the present invention.

FIG. 5 illustrates the pertinent portions of the exciter 303 in accordance with the present invention. Preferably, the exciter 303 is any T8000 series exciter made by the present assignee. Other similar exciters can, of course, be substituted. The exciter 303 includes an input latch 501, an edge detector 503, a signal modulation digital signal processor (DSP) 505, latches 507, a microcontroller 509, a digital quadrature modulator (DQM) digital signal processor (DSP) 513 including an interpolator 511, a digital-to-analog converter (DAC) 515, and an analog upconverter 517. Data information $D_1$, $D_2$ and mode information $D_3$, $D_4$ are applied from the precision timer DSP 435 to the input latch 501. The digital data provided as $D_1$, $D_2$, $D_3$, $D_4$ are read from the input latch 501 in synchronization with a clock signal, and are applied to the signal modulator DSP 505. The edge detector 503 determines when the digital data changes logic level and provides a corresponding pulse signal for each transition to the signal modulator DSP 505.

The microcontroller 509 preferably accepts mode information from either of two user interfaces, an I20 interface of Glenayre C2000 transmitter controller (not shown) or a VT-100 user interface of a Glenayre T8000 series exciter (not shown). The mode information is programmed to an electrically erasable programmable read-only memory (EEPROM). Because the exciter 303 preferably has numerous channels, with each channel preferably capable of accommodating four modes, the microcontroller 509 may program a maximum number of mode settings equal to the number of channels multiplied by four. Of course, other exciters having more or fewer modes per channel are also possible in accordance with the present invention. In any event, the stored mode settings are provided from the microcontroller 509 to the signal modulator DSP 505 through the latches 507.

The latches 507 comprise two 16-bit latches. Each latch serves as a one-way interface, i.e., one latch is used by the microcontroller to communicate with the signal modulator DSP 505 while the other latch is used by the signal modulator DSP 505 to communicate with the microcontroller 509. As the transmitter controller 301 provides mode information to the exciter 303, the microcontroller 509 writes information corresponding to the appropriate mode setting to the latches 507. The signal modulator DSP 505 reads the latches 507 to obtain the frequency deviation and frequency offset values for a current mode. The frequency deviation and frequency offset values are then used for modulation according to the current mode.

The signal modulator DSP 505 produces a modulated signal having both in-phase and quadrature components. The interpolator 511 samples the modulated signal from the signal modulator DSP 505 and interpolates between the sampled values to increase the effective sample rate at which the modulated signal is sampled. The output of the interpolator 511, an interpolated signal, is processed by the DQM DSP 513, which then modulates the interpolated signal from a complex signal to a pass band signal that is not complex. The resulting digital signal is provided to the DAC 515. The DAC 515 converts the received digital signal to an analog signal. The analog upconverter 517 converts the analog signal to a higher frequency, preferably 930 MHz. The radio signal is then applied to the power amplifier 305 for output and transmission as a radio signal. A more detailed description of the exciter 303 is provided by U.S. Pat. No. 5,418,818 to Marchetto et al., which is incorporated herein by reference with modifications to the signal modulator DSP 505 in accordance with the method and apparatus for on-the-fly mode change of the present invention, as described below.

Figure 6:
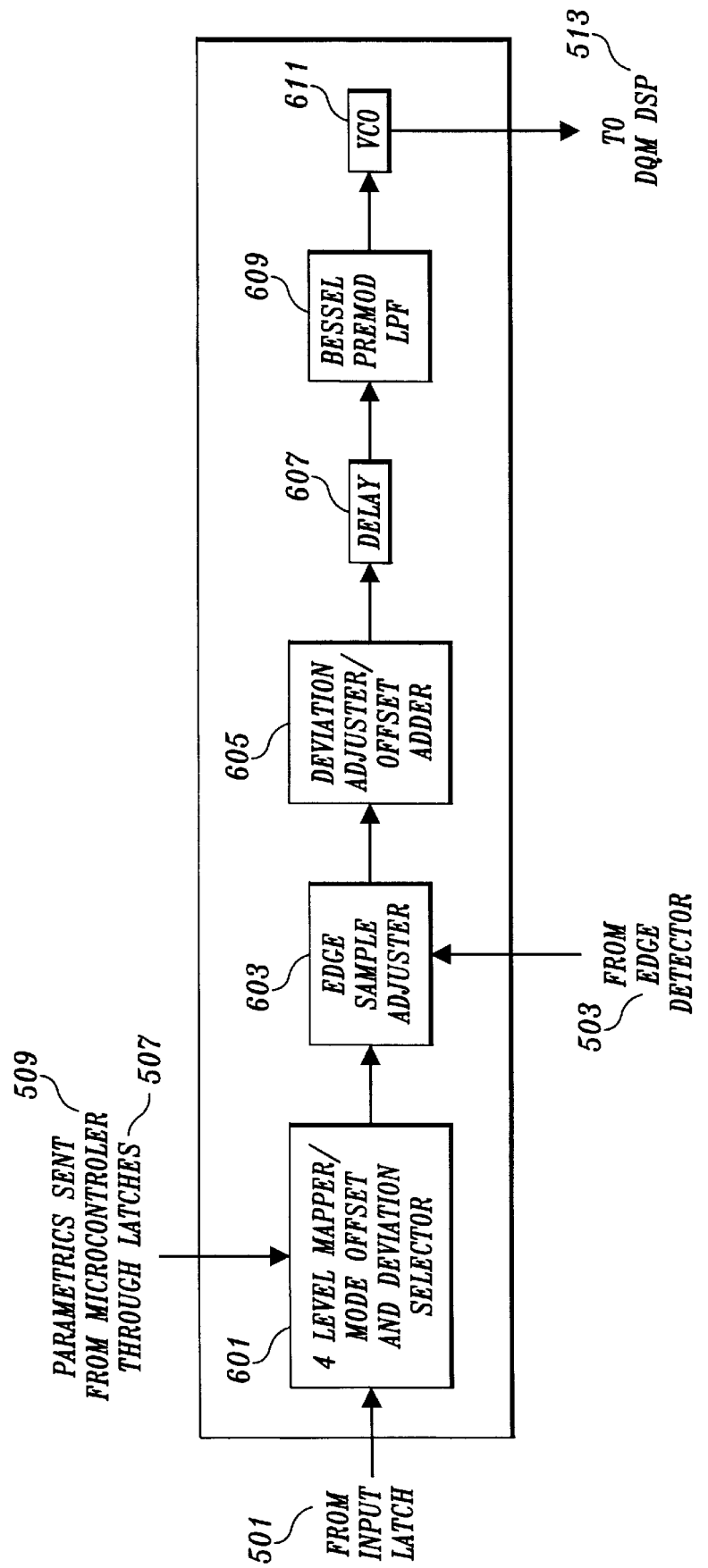
FIG. 6 is a functional block diagram of the operation of a signal modulator DSP illustrated in FIG. 5.

FIG. 6 is a basic functional block diagram of the signal modulator DSP 505 of the present invention. The signal modulator DSP 505 includes a four-level mapper/mode offset and deviation selector 601, an edge sample adjuster 603, a deviation adjuster/offset adder 605, a delay 607, a Bessel premodulation low pass filter (LPF) 609, and a voltage controlled oscillator (VCO) 611. The data bits provided to the input latch 501 are sampled at 66⅔ kHz and applied to the four-level mapper/mode offset and deviation selector 601. The four-level mapper/mode offset and deviation selector 601 maps data information $D_1$, $D_2$ to one of four specific levels. Preferably, the signal modulator DSP 505 is a fixed point digital signal processor that maps to a range of digital values from −32,767 to 32,767. Of course, floating point digital signal processors could also be used.

The four-level mapper/mode offset and deviation selector 601 receives data corresponding to the mode setting written on the latches 507. Using the frequency deviation and frequency offset for the current mode setting, the four-level mapper/mode offset and deviation selector 601 maps mode information $D_3$, $D_4$ to obtain values for a deviation adjust OTF_dev and an offset addition OTF_off.

The edge sample adjuster 603 receives the mapped data values and mode values. The edge sample adjuster 603 also receives the pulse signal triggered by the edge detector 603. As discussed more fully in the aforementioned U.S. Pat. No. 5,418,818 to Marchetto et al., the edge sample adjuster 603 operates to reduce problems associated with jitter.

The output of the edge sample adjuster 603 is applied to the deviation adjuster/offset adder 605. The deviation adjustor/offset adder 605 receives a frequency deviation value specified for the current paging protocol being used. For example, in POCSAG™, the frequency deviation is ±4500 Hz, and in FLEX™, the frequency deviation is ±4800 Hz. More specifically, the deviation adjuster/offset adder 605 produces a signal scaled by the deviation adjust OTF_dev, a factor equal to the frequency deviation value divided by a VCO limit value plus the greatest possible positive offset. Preferably, the VCO limit value is 5 kHz. Other VCO limit values could also be used. The deviation adjuster/offset adder 605 also adds the frequency offset addition OTF_off to the scaled signal to reduce the likelihood of lost pages due to phase cancellation. The frequency offset depends on the paging protocol to be simulcasted and other factors.

The output of the deviation adjuster/offset adder 605 is provided to the delay 607. The purpose of the delay 607 is twofold. First, it delays the signal in the data mode to equalize the processing time of the signal modulator DSP 605 between the data mode and the voice mode.

The Bessel premodulation LPF 609 receives the output signal of the delay 607, and convolves it with a Bessel-type finite impulse response (FIR) filter that meets European Radio Messaging Standard (ERMES™) specifications for a premodulation pulse shaping filter. It will be appreciated that the Bessel premodulation LPF 609 ensures that the power spectral density of the transmitted signal lies within a frequency domain in accordance with standards established by the Federal Communications Commission or other U.S. or foreign governmental entity. The filtered voltage signal output by the Bessel premodulation LPF 609 is applied to the VCO 611. The VCO 611 generates a complex output signal having a frequency corresponding to the received filter voltage signal, according to the disclosure in the aforementioned Marchetto patent.

Figure 7:
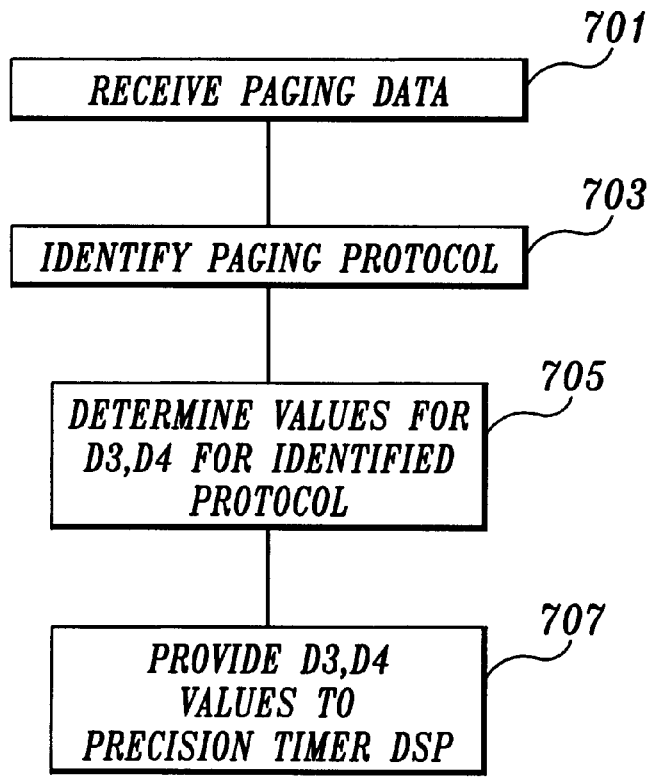
FIG. 7 is a flow diagram illustrating the operation of a microcontroller illustrated in FIG. 4.

FIG. 7 is flow diagram of a preferred software routine of the operation of the microcontroller 401 (FIG. 4) as it relates to the present invention. At a step 701, paging data, including the protocol identifier, is received. At a next step 703, the paging protocol is identified, based upon the information contained in the protocol identifier. At a next step 705, values for $D_3$, $D_4$ for the identified paging protocol are determined. At a next step 707, the determined values for $D_3$, $D_4$ are supplied to the precision timer DSP 405.

Figure 9:
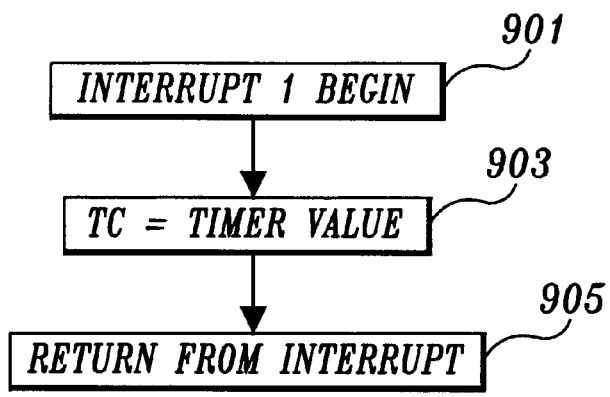
FIG. 9 is a flow diagram illustrating a second interrupt routine of the signal modulator digital signal processor of the exciter illustrated in FIG. 5.
Figure 8A:
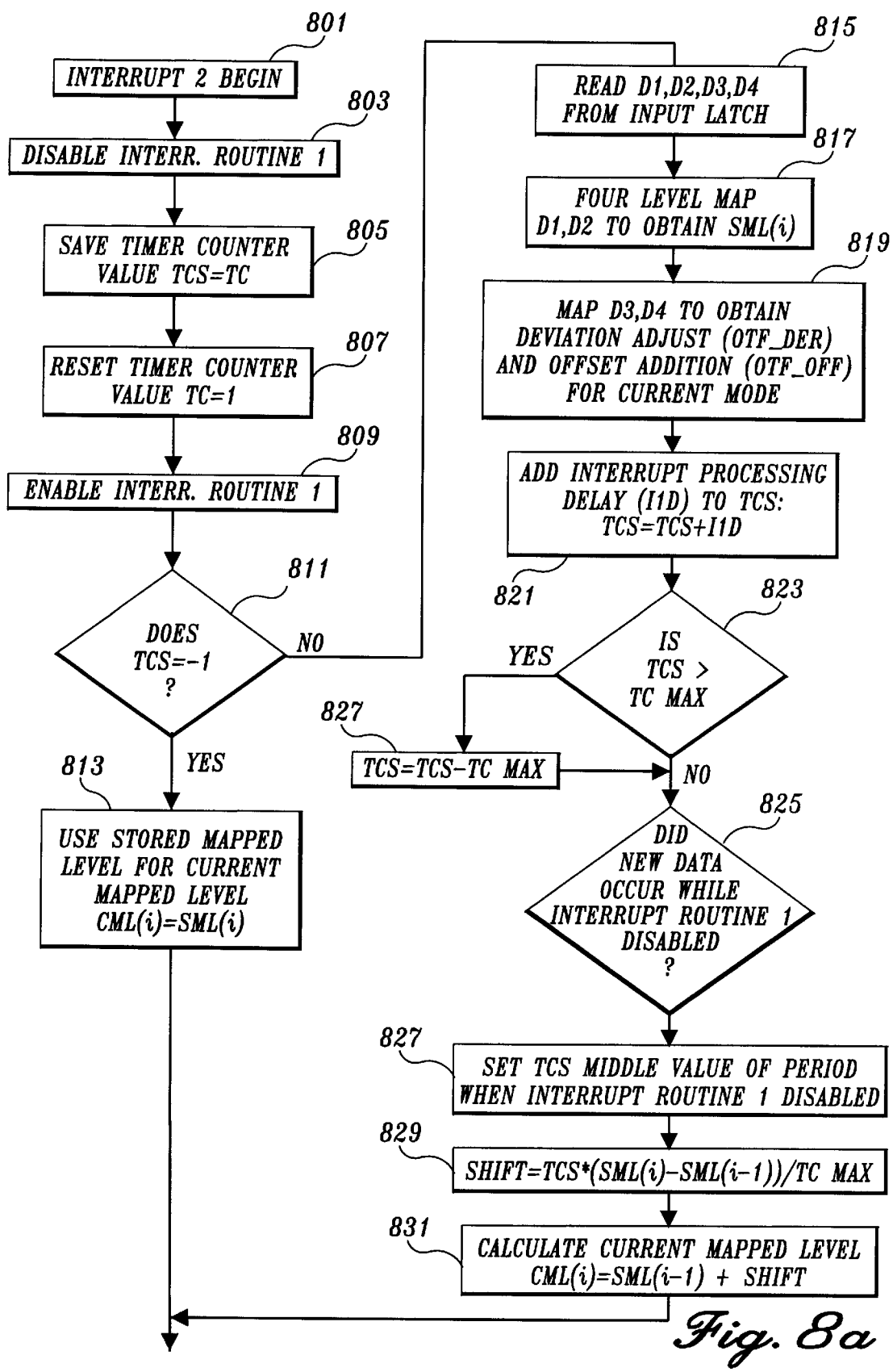
FIGS. 8A–8B are a flow diagram illustrating a first interrupt routine of a signal modulator digital signal processor of the exciter illustrated in FIG. 5.
Figure 8B:
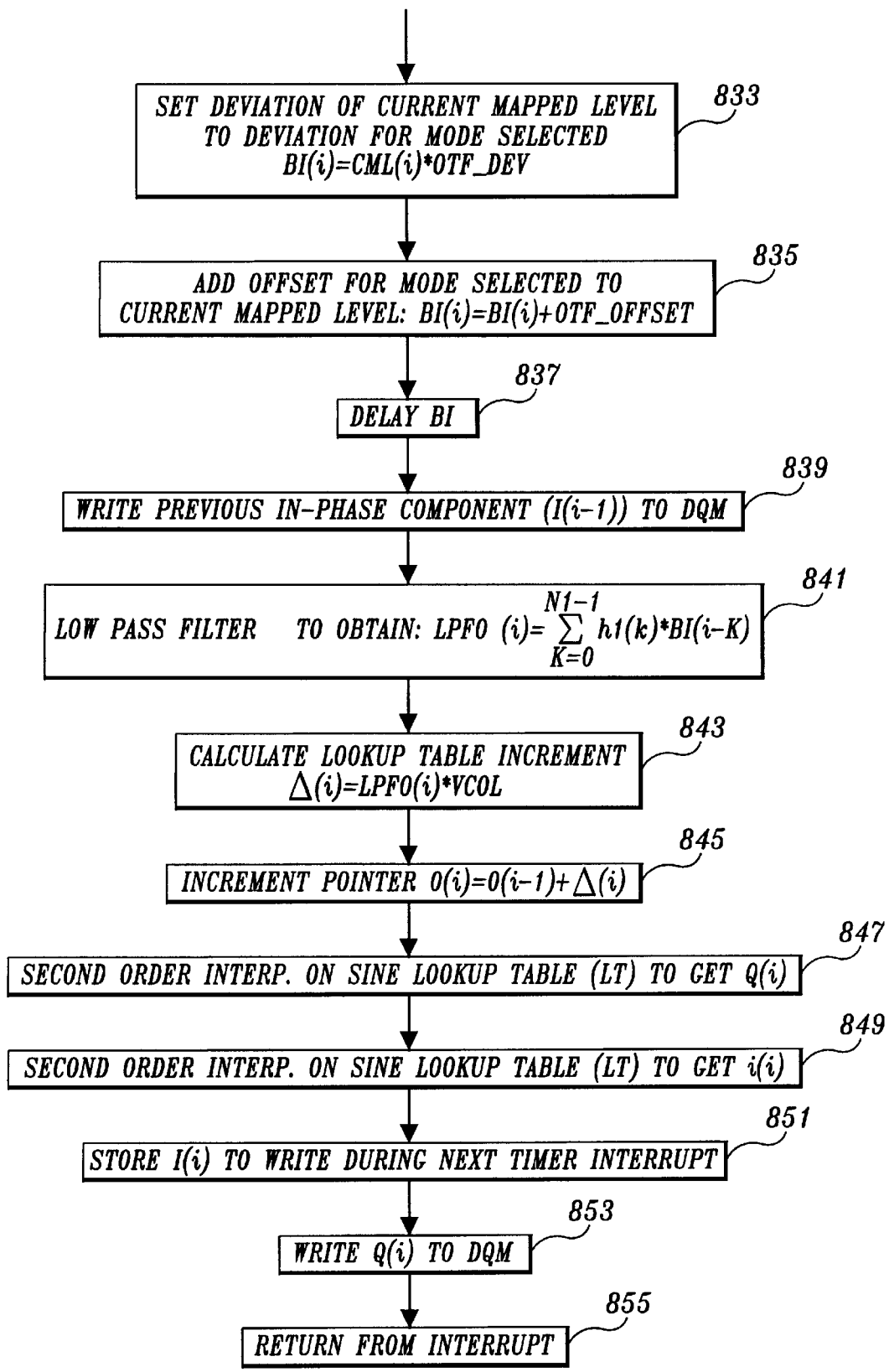

FIGS. 8A–8B are a flow diagram of a preferred interrupt routine 2 illustrating the operation of the signal modulator DSP 505 (FIG. 6) in accordance with the present invention. Interrupt routine 2 illustrates the operation of the signal modulator DSP 505 in modulating an input signal including data information and mode information. At a step 801, the interrupt routine 2 begins when a timer implemented in the signal modulator DSP 505 reaches zero by counting down from 149. The number 149 is the operating rate of the signal modulator DSP 505 (10 MHz) divided by the sampling rate (66⅔ kHz−1) minus one. Then, in a step 803, an interrupt routine 1 is disabled. FIG. 9 is a flow diagram of a preferred interrupt routine 1 implemented when the data input signal changes state. In particular, interrupt routine 1 determines a timer value corresponding to when new data is received. In a step 901, interrupt routine 1 begins when new data is detected by the signal modulator DSP 505. In a step 903, a variable TC (timer counter) is set equal to the current value of the timer. In a step 905, interrupt routine 1 returns from the interrupt.

As shown in FIGS. 8A–8B, in a step 805, a variable TCS (save timer counter) is set equal to the value of the variable TC. Variable TC is reset to have a value equal to −1 in a step 807. In a step 809, interrupt routine 1 is enabled. At a decision step 811, it is determined if variable TCS is equal to −1. If variable TCS does equal −1, then it is determined that no new data has been received and interrupt routine 2 proceeds to a step 813. In the step 813, a stored mapped level (based on previous sample) SML(i) is used as a current mapped level CML(i). The letter i represents the current sample processed according to the interrupt routine 2.

In a next step 833, the current mapped level CML(i) is multiplied with the frequency deviation adjust value OTF_dev corresponding to the current mode and its associated paging protocol. The frequency deviation value is the optimal frequency deviation for a given protocol divided by the VCO limit value VCOL plus the greatest possible offset. The product BI(i) of the current mapped level CML(i) and the frequency deviation adjust value OTF_dev is adjusted by the frequency offset addition value OTF_off in a step 835.

In a step 837, a delay is provided to equalize the processing time associated with the data mode and the voice mode, or to synchronize the broadcast of the paging station 207 with other transmitters in a paging system. In a next step 839, a previous in-phase component of the signal modulator's output I(i−1) is provided to the DQM DSP 513. The previous in-phase component is not provided with the corresponding, previous quadrature component at the same time so that the DQM DSP 513 has sufficient time to process both components. In a next step 841, the signal BI is low pass filtered by convolving with the constant coefficients of the Bessel premodulation LPF 509, according to the equation:

$$LPFO(i) = \sum_{k=0}^{NI-1} h1(k) * BI(i-k) \quad (1)$$

where the constant coefficients of the filter are requested by h1(k).

At a next step 843, the output of the Bessel premodulation LPF 509, LPFO(i), is multiplied by the value of VCOL plus the greatest possible offset to obtain a change −(i). Change −(i) is added to a previous value of a pointer II(i−1) to obtain the current value of the pointer II(i) in a next step 845. In a step 847, a second order interpolation is performed on a look-up table using the value of the pointer II(i) to obtain the quadrature component Q(i). In a next step 849, a second order interpolation using the value of the pointer II(i) is again performed to obtain the in-phase component I(i). The in-phase component I(i) is stored in an internal data buffer in a step 851 so that it can be written to the DQM DSP 513 during the next timer interrupt for interrupt routine 2. Quadrature component Q(i) is written to the DQM DSP 513 in a step 853. A step 855 returns from the interrupt.

At the decision step 811, if it is determined that variable TCS does not equal −1, then new data has been detected and the interrupt routine continues to a step 815. In the step 815, the four-level mapper/mode offset and deviation selector 501 reads the data information and mode information $D_1$, $D_2$, $D_3$, $D_4$. At a next step 817, the data information $D_1$, $D_2$ are four-level mapped and assigned as the stored mapped level for the current sample SML(i). At a next step 819, the mode information $D_3$, $D_4$ are mapped to obtain the frequency deviation adjust value OTF_dev and the frequency offset addition value OTF_off for the current mode. At a step 821, variable TCS is incremented by a processing delay I1D to account for the time delay between when a new data edge is detected and when the associated value of the timer in interrupt routine 1 can be stored. Preferably, I1D is equal to approximately five cycles, i.e., five instructions. Of course I1D can be set equal to any other value depending on the actual duration of the delay. In a determination step 823, it is determined if variable TCS is greater than or equal to $TC_{max}$, which has the value of 149. Of course, other values of $TC_{max}$ are possible depending on the sampling rate in a particular application. If variable TCS is greater than or equal to $TC_{max}$, then variable TCS is decreased by the value of $TC_{max}$ in a step 827 to assign to variable TCS a value between zero and 149 before proceeding to a decision step 825. If variable TCS is not greater than or equal to $TC_{max}$, then the decision step 825 follows directly.

At the decision step 825, it is determined if a new data edge occurred when interrupt routine 1 was disabled. If so, the variable TC will be assigned the first value after the interrupt routine 1 is enabled in the step 809 above. In this case, it is uncertain when the new data edge occurred. To address this uncertainty, an estimate is made at a step 827 by setting variable TCS to a middle value within the time during which interrupt routine 1 was disabled. Thereafter, a shift is implemented in a step 829 to reduce jitter. The shift is obtained by:

$$SHIFT = \frac{TCS}{TC_{\max}} * (SML(i) - SML(i-1)) \quad (2)$$

At a next step 831, the current mapped level CML(i) is obtained by adding the shift to the previous stored mapped level SML(i−1). After the step 831, the interrupt routine 2 continues to the step 833, as described above.

Figure 10:
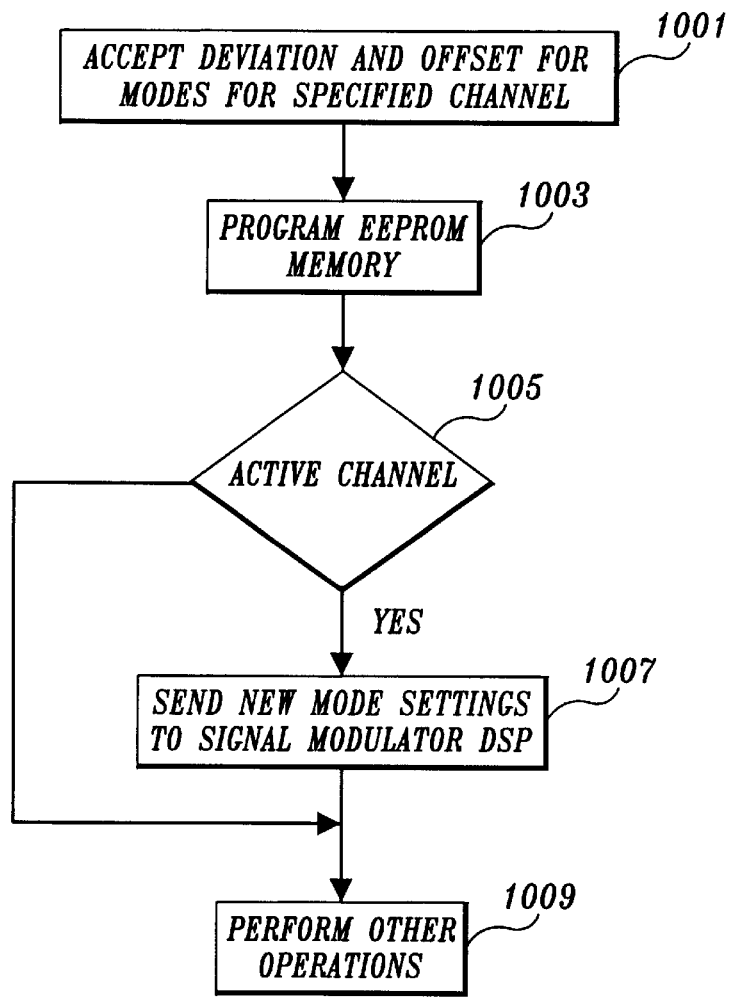
FIG. 10 is a flow diagram illustrating the operation of a microcontroller of the exciter illustrated in FIG. 5 in implementing modes settings.
Figure 11:
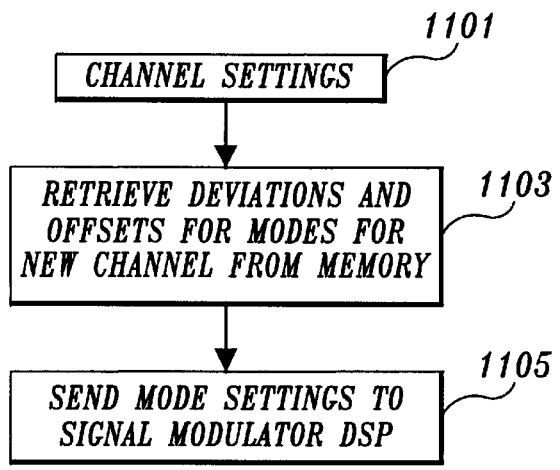
FIG. 11 is a flow diagram illustrating the operation of the microcontroller of the exciter illustrated in FIG. 5 in implementing a channel change.

FIGS. 10–11 are flow diagrams of preferred software routines of the operation of the microcontroller 509 that is germane to the present invention. FIG. 10 depicts the operation of the microcontroller 509 in implementing mode settings in the absence of a channel change in the exciter 303. FIG. 11 depicts the operation of the microcontroller 509 when a channel change is implemented in the exciter 303.

With respect to FIG. 10, the microcontroller 509 receives an appropriate mode setting associated with each possible mode in the exciter 303 in a step 1001. As stated above, the mode settings are applied to the microcontroller 509 from two possible user interfaces. In a next step 1003, the mode settings are programmed in the EEPROM. At a next decision step 1005, it is determined whether the base station 207 is currently transmitting on a channel for which a mode setting was accepted and saved in the steps 1001, 1003 above. If so, at a step 1007, the new mode setting is sent ultimately to the signal modulator DSP 505 so that the new mode setting can be implemented during modulation. At the next step 1009, the microcontroller 509 continues processing in accordance with other functions not germane to the present invention. At the decision step 1005, if it is determined that no newly-received mode settings correspond to an active channel, no new mode settings can and need be provided to the signal modulator DSP 505. The routine then continues to the step 1009, as described above.

FIG. 11 begins when a channel change in the exciter 303 is detected by the microcontroller 509 in a step 1101. In a next step 1103, the microcontroller 509 retrieves new mode settings corresponding to the modes implemented in the newly-selected channel. At a next step 1105, the retrieved mode settings are ultimately provided to the signal modulator DSP 505 and used in modulation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for transmitting paging data formatted in a plurality of paging protocols from a base station in a paging system, the base station having a transmitter controller and an exciter, the method comprising the steps of:

assigning a first mode setting to a first paging protocol;

assigning a second mode setting to a second paging protocol;

transmitting data information recording to said first paging protocol and said second paging protocol from the transmitter controller to the exciter;

transmitting mode information according to said first paging protocol and said second paging protocol from the transmitter controller to the exciter; and transitioning between the transmission of the paging data according to said first paging protocol and the transmission of the paging data according to said second paging protocol without delay;

wherein said assigning a first mode setting step comprises the step of using a predetermined value of frequency offset for said first mode setting and said assigning a second mode setting step comprises the step of using a predetermined value of frequency offset for said second mode setting.

2. A method as claimed in claim 1 wherein said assigning a first mode setting step comprises the step of using a predetermined value of frequency deviation for said first mode setting and said assigning a second mode setting step comprises the step of using a predetermined value of frequency deviation for said second mode setting.

3. A method as claimed in claim 2 wherein said assigning a first mode setting step comprises the step of using a predetermined value of frequency offset for said first mode setting and said assigning a second mode setting step comprises the step of using a predetermined value of frequency offset for said second mode setting.

4. A method as claimed in claim 1 wherein said transmitting data information step includes the step of changing from data information according to said first paging protocol to said second paging protocol at a data transition time and said transmitting mode information step includes the step of changing from mode information according to said first paging protocol to said second paging protocol at a mode transition time, the method further comprising the step of synchronizing said data transition time with said mode transition time.

5. A method as claimed in claim 1 further comprising the steps of:

synchronizing the transmission of said data information according to said first paging protocol with said mode information according to said first paging protocol; and synchronizing the transmission of said data information according to said second paging protocol with said mode information according to said second paging protocol.

6. A method as claimed in claim 1 wherein said first paging protocol is FLEX™.

7. A method as claimed in claim 1 wherein said first paging protocol is POCSAG™.

8. A method as claimed in claim 1 wherein said first paging protocol is ERMES™.

9. A method as claimed in claim 1 further comprising the steps of:

assigning a third mode setting to a third paging protocol, said third paging protocol different from both said first paging protocol and said second paging protocol; and transmitting said paging data according to said third paging protocol from the base station on said frequency.

10. A method as claimed in claim 1 further comprising the steps of:

assigning a fourth mode setting to a fourth paging protocol, said fourth paging protocol different from said first paging protocol, said second paging protocol, and said third paging protocol; and transmitting said paging data according to said fourth paging protocol from the base station on said frequency.

11. A method as claimed in claim 1 wherein said first paging protocol is REFLEX™.

12. A method as claimed in claim 1 further comprising the step of synchronizing said data information according to said first paging protocol with said mode information according to said first paging protocol.

13. A method as claimed in claim 12 further comprising the step of synchronizing said data information according to said second paging protocol with said mode information according to said second paging protocol.

14. A base station in a paging system for transmitting pages according to a plurality of paging protocols comprising:

a transmitter controller configured to process paging information, identify therefrom the plurality of paging protocols, and produce and transmit data information and mode information corresponding to each identified paging protocol;

an exciter, coupled to said transmitter controller, configured to receive said data information and said mode information, said data information and said mode information used to modulate a signal corresponding to a channel and produce a modulated signal according to said each identified paging protocol, said modulated signal transitioning from one of said each identified paging protocol to another without delay;

wherein said mode information corresponds to a predetermined mode setting, said mode setting including a frequency deviation for said each identified paging protocol.

15. A base station as claimed in claim 15 wherein said mode information corresponds to a predetermined mode setting, said mode setting including a frequency offset for said each identified paging protocol.

16. A base station as claimed in claim 15 wherein said mode setting includes a frequency deviation for said each identified paging protocol.

17. A base station as claimed in claim 14 wherein said transmitter controller is configured to synchronize a data transition with a mode transition, said data transition occurring during a change from data information according to a first of said each identified paging protocol to a second of said each identified paging protocol, said mode transition occurring during a change from mode information according to said first of said each identified paging protocol to said second of said each identified paging protocol.

18. A base station as claimed in claim 14 wherein said transmitter controller is configured to synchronize the transmission of both said data information and said mode information corresponding to said each identified paging protocol.

19. A base station as claimed in claim 14 wherein said each identified paging protocol includes FLEX™.

20. A base station as claimed in claim 14 wherein said each identified paging protocol includes ERMES™.

21. A base station as claimed in claim 14 wherein said each identified paging protocol includes POCSAG™.

22. A base station as claimed in claim 14 wherein the plurality of paging protocols numbers is three paging protocols, said each identified paging protocol having a unique corresponding mode setting.

23. A base station as claimed in claim 14 wherein the plurality of paging protocols is four paging protocols, said each identified paging protocol having a unique corresponding mode setting.

24. A base station as claimed in claim 14 wherein said each identified paging protocol includes GOLAY™.

25. A base station as claimed in claim 14 wherein said each identified paging protocol includes REFLEX™.

26. A base station as claimed in claim 14 wherein said exciter and said transmitter controller are integrated.

27. A base station as claimed in claim 14 wherein said exciter is configured to synchronize said data information with said mode information corresponding to said each identified paging protocol.

28. A method for transmitting paging data formatted in a plurality of paging protocols from a base station in a paging system, the base station having a transmitter controller and an exciter, the method comprising the steps of:

assigning a first mode setting to a first paging protocol;

assigning a second mode setting to a second paging protocol;

transmitting data information according to said first paging protocol and said second paging protocol from the transmitter controller to the exciter;

transmitting mode information according to said first paging protocol and said second paging protocol from the transmitter controller to the exciter; and transitioning between the transmission of the paging data according to said first paging protocol and the transmission of the paging data according to said second paging protocol without delay;

wherein said assigning a first mode setting step comprises the step of using a predetermined value of frequency deviation for said first mode setting and said assigning a second mode setting step comprises the step of using a predetermined value of frequency deviation for said second mode.

29. A method as claimed in claim 28 wherein said assigning a first mode setting step comprises the step of using a predetermined value of frequency offset for said first mode setting and said assigning a second mode setting step comprises the step of using a predetermined value of frequency offset for said second mode setting.

30. A method is claimed in claim 28 wherein said transmitting data information step includes the step of changing from data information according to said first paging protocol to said second paging protocol at a data transition time and said transmitting mode information step includes the step of changing from mode information according to said first paging protocol to said second paging protocol at a mode transition time, the method further comprising the step of synchronizing said data transition time with said mode transition time.

31. A method as claimed in claim 28 further comprising the steps of:

synchronizing the transmission of said data information according to said first paging protocol with said mode information according to said first paging protocol; and synchronizing the transmission of said data information according to said second paging protocol with said mode information according to said second paging protocol.

* * * * *

UNITED STATES PATENT AND TRADEMARK OFFICE
CERTIFICATE OF CORRECTION

PATENT NO. : 5,995,850
DATED : November 30, 1999
INVENTOR(S) : P.A. Goud et al.

It is certified that error appears in the above-identified patent and that said Letters Patent is hereby corrected as shown below:

| COLUMN | LINE | |
|---|---|---|
| 12 (Claim 1, | 25 line 8) | "recording" should read --according-- |
| 13 (Claim 15, | 59 line 1) | "Claim 15" should read --Claim 14-- |

Signed and Sealed this

Twenty-seventh Day of February, 2001

Attest:

NICHOLAS P. GODICI

Attesting Officer      Acting Director of the United States Patent and Trademark Office